United States Patent [19]
Burns et al.

[11] Patent Number: 5,458,000
[45] Date of Patent: Oct. 17, 1995

[54] STATIC PRESSURE COMPENSATION OF RESONANT INTEGRATED MICROBEAM SENSORS

[75] Inventors: David W. Burns; J. David Zook, both of Minneapolis, Minn.

[73] Assignee: Honeywell Inc., Minneapolis, Minn.

[21] Appl. No.: 94,785

[22] Filed: Jul. 20, 1993

[51] Int. Cl.⁶ .............................. G01D 3/04; G01L 19/04
[52] U.S. Cl. .............................. 73/708; 73/497; 73/702; 73/514.33
[58] Field of Search ................ 73/517 AV, 702, 73/704, 778, 862.41, 862.59, 1 DV, 1 B, 1 D, 4 R, 497, 708, 765, 766, 862.622, 862.623, DIG. 10

[56] References Cited

U.S. PATENT DOCUMENTS

| | | | |
|---|---|---|---|
| 3,888,115 | 6/1975 | Schwartz | 73/765 |
| 4,049,997 | 9/1977 | McGhee | 73/664 X |
| 4,127,110 | 11/1978 | Bullara | 73/718 X |
| 4,175,243 | 11/1979 | Corbett | 73/708 X |
| 4,372,164 | 2/1983 | Brown et al. | 73/708 X |
| 4,439,705 | 3/1984 | Corbett | 310/338 |
| 4,444,055 | 4/1984 | Balkanli | 73/708 |
| 4,535,638 | 8/1985 | Eer Nisse et al. | 73/862.59 |
| 4,598,381 | 7/1986 | Cacci | 364/558 |
| 4,638,664 | 1/1987 | Tamura | 73/708 X |
| 4,765,188 | 8/1988 | Krechmery | 73/708 |
| 5,101,664 | 4/1992 | Hockaday et al. | 73/708 X |
| 5,186,053 | 2/1993 | Egley et al. | 73/517 AV X |
| 5,233,874 | 8/1993 | Putty et al. | 73/517 AV |
| 5,275,055 | 1/1994 | Zook et al. | 73/778 |
| 5,339,698 | 8/1994 | Robinson et al. | 73/862.59 |

OTHER PUBLICATIONS

"Construction and Performance Characteristics of Polysilicon Resonating Beam Force Transducers", by H. Guckel, et al, The Third Toyota Conference, Integrated Micro Motion Systems Micromachining, Control & Application, Nissin, Aichi, Japan, Oct. 22–25, 1989 5 pages.

Primary Examiner—Thomas P. Noland
Attorney, Agent, or Firm—John G. Shudy, Jr.

[57] ABSTRACT

A temperature and static pressure compensated differential pressure sensor includes a semiconductor substrate in which a flexible, pressure responsive diaphragm is formed. A pressure responsive resonant microbeam is fabricated at the diaphragm periphery. For temperature compensation, a secondary resonant microbeam sensor is fabricated on the substrate at a peripheral location beyond the point of substrate attachment to a pressure tube or other support. For static pressure compensation, another secondary resonant microbeam can be positioned remote from the diaphragm and at a location of maximum substrate response to static pressure. A further resonant microbeam can be mounted at the diaphragm center to augment the signal due to diaphragm deflections. Also disclosed is an accelerometer including a proof mass, a rigid rim surrounding the proof mass, and a series of narrow, flexible bridges supporting the proof mass relative to the rim. The bridges flex responsive to accelerations, thus to allow the proof mass to move relative to the rim. At least one of the bridges incorporates a resonant microbeam for measuring acceleration by virtue of the induced strain from flexure of its associated bridge. For temperature compensation, a secondary resonant microbeam is fabricated along the rim.

25 Claims, 5 Drawing Sheets

STATIC PRESSURE COMPENSATION OF RESONANT INTEGRATED MICROBEAM SENSORS

BACKGROUND OF THE INVENTION

The present invention relates to transducers that utilize induced strain to measure acceleration pressure, temperature and other variables, and more particularly to providing temperature and static pressure compensation in such devices.

Resonant transducers have been used for many years to achieve high accuracy measurements. Vibrating transducers have been used in precision accelerometers and pressure sensors. These devices operate on the principle that the natural frequency of vibration (i.e. resonant frequency of an oscillating beam or other member) is a function of the induced strain along the member. More particularly, tensile forces elongating the beam increase its resonant frequency, while forces compressing the beam reduce the natural frequency. The frequency output of resonant gages is readily converted to digital readings reflecting the measured quantity, requiring only a counter and a reference clock for this purpose. Thus, such gages are simple and reliable, and provide a high degree of discrimination while using a relatively simple interface to digital signal processing circuitry.

One particularly effective transducer of this type is a resonant integrated microbeam sensor, for example as disclosed in U.S. patent application Ser. No. 07/937,068, filed Aug. 31, 1992 and now U.S. Pat. No. 5,275,055 entitled "Resonant Gage with Microbeam Driven in Constant Electric Field", and assigned to the assignee of this application. The sensor includes a silicon substrate, a polysilicon flexure beam attached at both ends to the substrate, and a polysilicon rigid cover cooperating with the substrate to enclose the flexure beam within a sealed vacuum chamber. A pair of bias electrodes on opposite sides of the beam create a constant electrical field about the flexure beam. A drive electrode on the flexure beam is selectively charged to oscillate the beam. A piezoresistive element on the flexure beam is used to indicate beam position, and also to provide feedback to the drive oscillator. Thus, the beam tends to oscillate at its natural resonant frequency.

The sensor can be fabricated on a pressure sensor diaphragm or a flexure of an accelerometer, to be elongated or compressed by deflections of the diaphragm or flexure in response to pressure changes and accelerations, respectively. While satisfactory in many of these applications, the sensors are subject to error due to deviations in temperature and in static pressure.

It is known, in connection with resonant sensors, to provide compensation for variations in temperatures and other conditions. For example, U.S. Pat. No. 4,535,638 (EerNisse et al) discloses a resonator transducer system in which a vibratory element such as a quartz crystal is driven to oscillate at two frequencies, both of which vary with changes in applied force and changes in temperature. The frequency outputs are processed by a computer containing predetermined coefficients for correcting as to the temperature effect.

U.S. Pat. No. 4,598,381 (Cucci) discloses a pressure compensated differential pressure sensor. A reference sensor senses a relatively low reference pressure, and a second sensor senses a differential between the lower pressure and a higher second pressure. Outputs of the pressure sensors and a temperature sensor are provided to a computer, programmed to correct for temperature effects. The computer includes an analog to digital converter receiving the temperature sensor output.

In U.S. Pat. No. 4,765,188 (Krechmery et al.), a pressure transducer includes a diaphragm with several piezoresistor strain gages for sensing pressure. A temperature dependant resistor also is formed on the diaphragm. The output of the temperature sensitive resistor is converted to a digital signal provided to a programmable read only memory (Prom). The Prom stores correction data to provide temperature compensation.

While the above approaches are workable, they require storage of compensation data, and frequently require analog to digital conversion, adding on to complexity of sensing and compensation circuitry and thus increasing the difficulty of semiconductor device fabrication.

Therefore, it is an object of the present invention to provide a resonant sensing device in which sensors provided for compensation generate digital outputs, eliminating the need for analog to digital signal conversion.

Another object is to provide, in a single measuring device, the combination of a primary resonant sensor and at least one secondary resonant sensor for compensation.

Yet another object is to provide a measuring device in which one or more secondary resonant sensors used for compensation are substantially identical in size and internal strain, to provide for simple and reliable compensation that does not require storage of multiple compensation values in computer memory.

SUMMARY OF THE INVENTION

To achieve these and other objects, there is provided a parameter measuring device. The device includes a semiconductor substrate having a substantially rigid first region, and a second region substantially more flexible than the first region. An elongate primary vibratory element has opposite first and second end portions fixed with respect to the second region, for longitudinal extension and compression of the vibratory flexure element responsive to flexure of the second region. The device further includes an elongate secondary vibratory element fixed with respect to the first region, having a natural resonant frequency that varies responsive to changes in a secondary parameter but is substantially unaffected by changes in the primary parameter.

The primary vibratory element responds by an increase in its natural resonant frequency with vibratory element elongation, and a decrease as the element either contracts or is compressed. The primary vibratory element responds to fluctuations in the primary parameter and in the secondary parameter, while the secondary vibratory element responds only to fluctuations in the secondary parameter.

Each of the primary and secondary vibratory elements is driven at its resonant frequency by an associated means for generating a substantially uniform and constant electrical field in the region of the vibratory element, a position sensing means for sensing the position of the vibratory element relative to the substrate, and an oscillating means for generating a periodic drive voltage signal responsive to changes in the vibratory element position. The drive voltage signal causes a periodic mechanical oscillation of the vibratory element relative to the substrate. The oscillating means continually and controllably adjusts the drive signal frequency in response to variations in the position signal frequency, thereby adjusting the drive signal toward coincidence with a natural resonant frequency of the mechanical oscillation.

The measuring device further includes signal processing means for receiving the resonant frequency outputs of the primary and secondary vibratory elements, and for compensating the primary vibratory element by combining it with the secondary vibratory element output in a manner to extract the portion of the frequency dependant on fluctuations in the secondary parameter. The result is a frequency output dependent only upon the primary measured parameter.

In one particularly preferred embodiment, the primary and secondary vibratory element are substantially identical in size, material and residual strain. In that event, the secondary output is used as a reference frequency, and the ratio of the square of the primary frequency to the square of the secondary frequency varies with applied strain according to the following formula:

$$\frac{f_p^2}{f_s^2} = a + b\epsilon$$

where $f_p$ is the primary frequency, $f_s$ is the secondary or reference frequency, $\epsilon$ is applied strain (to the primary flexure member), and a and b are constants. Accordingly, by measuring $f_p$ and $f_s$ at two different values of the primary parameter while maintaining the secondary parameter constant (for example, measuring at two different pressures while maintaining temperature), the constants a and b can be determined. Once determined, these constants yield a compensated value of the primary parameter, based on strain applied to the primary flexure member as determined by the resonant frequency of the primary flexure member.

The primary and secondary parameters being measured play a key role in the positioning of the primary and secondary flexure beams. For example, in a pressure transducing device including a semiconductor chip with a diaphragm mounted atop a tube of Pyrex glass or similar material, the diaphragm provides the more flexible second substrate region, and a rigid rim surrounding the diaphragm and mounted to the tube provides the more rigid first substrate region. The preferred location for the primary vibratory element is at the diaphragm periphery, either perpendicular to the edge of a rectangular diaphragm or radial relative to a circular diaphragm. The secondary vibratory element, e.g. a temperature sensing microbeam, is preferably positioned near the periphery of the chip, beyond the pyrex tube. A further secondary vibratory element, a static pressure sensing microbeam, can be positioned along the chip periphery where the static pressure effects are likely to be largest. Alternatively, a second diaphragm smaller than the differential pressure sensing diaphragm can be fabricated into the chip for use with a static pressure sensor.

Finite element models of the chip are advantageously used in determining appropriate vibratory element positions. Such models can be based on differential pressure in the range about 15 psi, or can be based on static pressure in the range of about 1000 psi. Thus, in accordance with the present invention there is provided a simple and reliable means for employing a resonant microbeam to sense differential pressures and accelerations, substantially free of temperature and static pressure effects.

IN THE DRAWINGS

For a further understanding of the above and other features and advantages, reference is made to the detailed description and to the drawings, in which.

DETAILED DESCRIPTION OF THE PREFERRED EMBODIMENTS

Figure 1:
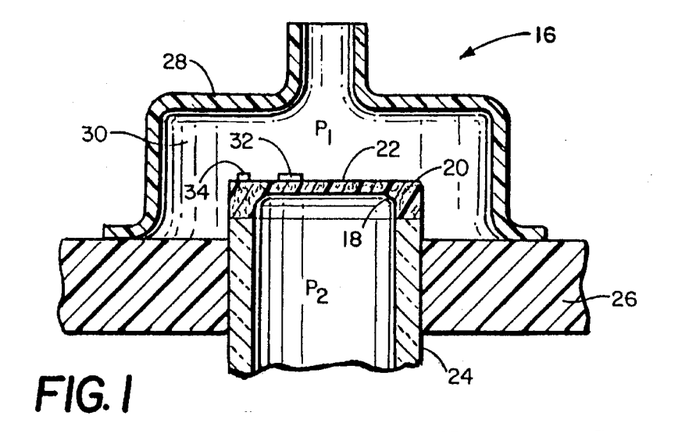
FIG. 1 is an elevational sectional view of a pressure sensing device constructed in accordance with the present invention.
Figure 2:
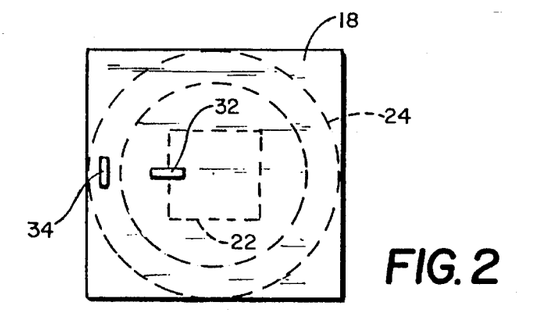
FIG. 2 is a top plan view of the pressure sensing device.

Turning now to the drawings, there is shown in FIGS. 1 and 2 a pressure sensing device 16. The device includes a silicon substrate or base 18 including a substantially rigid peripheral region or rim 20 and a diaphragm 22 surrounded by the rim. The diaphragm is substantially square, with each side being in the range of about 4–150 mils in length. The diaphragm is flexible and thin, e.g. having a thickness in the range of 10–100 micrometers. The diaphragm thus provides a substrate region substantially more flexible than the peripheral region. The bottom of peripheral rim 20 is thermoelectrically bonded to a tube 24 of Pyrex (brand) glass or other suitable material, e.g. ceramics, mullites, certain plastics or silicon. Tube 24 is supported within rigid structure at 26. A cover 28 is fastened to the support structure, and cooperates with the structure to define a chamber 30. Thus, sensing device 16 is positioned at the interface of chamber 30 and the interior of tube 24.

A pressure responsive resonant strain gage 32 is fabricated on the top of sensing device 16, to diaphragm 22 near the peripheral region 20. A substantially similar resonant gage 34 is mounted to the sensing device at peripheral region 20, in particular within the projection of the annular face of tube 24. Resonant gage 34 is selectively oriented with respect to tube 24, i.e. perpendicular to the tube radius, to minimize static pressure effects. Accordingly, resonant gage 34 does not respond to flexure of the diaphragm. Gage 34 thus is used as a reference, for compensating for movements of gage 32 in response to changes in temperature rather than to pressure induced diaphragm flexure. While diaphragm 22 is square as shown in FIG. 2, the diaphragm can be formed with an alternative shape, e.g. circular or rectangular, if desired. Anisotropic etching is employed to form rectangular or square diaphragms, while isotropic etching techniques can be employed to form a circular diaphragm.

Figure 3:
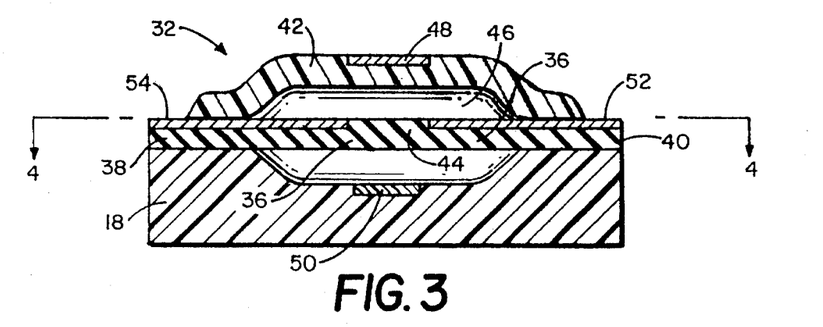
FIG. 3 is an enlarged partial sectional view showing part of FIG. 1.

As seen in FIG. 3, resonant gage 32 includes an elongate beam 36 formed of fine grain, low tensile strain polysilicon (polycrystalline silicon). Beam 36 has a length in the range of 50–1000 micrometers and more preferably about 200 micrometers, a thickness (vertical in FIG. 3) of about 1–3 micrometers, and a width of about 20–80 micrometers. Opposite ends of the beam, indicated at 38 and 40, are fixed between substrate 18 (more particularly the diaphragm) and a substantially rigid shell or cover 42, also formed of polysilicon. A medial region 44 of the beam is free to oscillate within a chamber 46 formed by the cover and the substrate.

An upper bias electrode 48 is formed (e.g. by ion implantation) into a surface portion of cover 42, and a similar lower bias electrode 50 is formed into a surface of diaphragm 22 along the bottom of chamber 46. A drive electrode 52 is formed along a portion of the top surface of beam 36. A piezoresistor 54 is formed along the top surface of the beam and is co-planar with drive electrode 52, spaced apart from electrode 52 and therefore electrically isolated from the drive electrode. Electrodes 48 and 50 are spaced apart from drive electrode 52 transversely with respect to the length or longitudinal dimension of the beam. Drive electrode 52 is approximately transversely centered between the bias electrodes.

Figure 4:
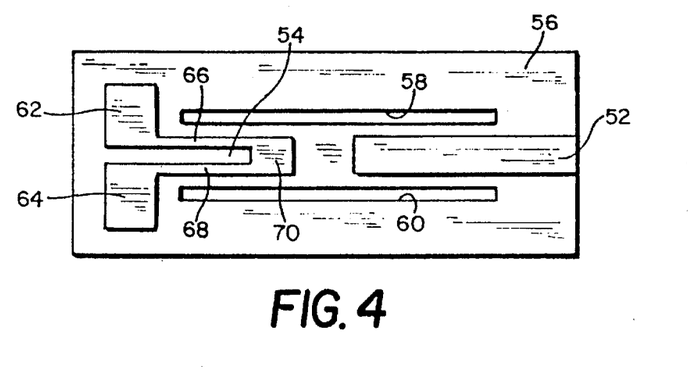
FIG. 4 is a sectional view taken along the line 4—4 in FIG. 3.

As seen in FIG. 4, beam 36 is formed as part of a larger polysilicon thin film 56, with longitudinal gaps 58 and 60 extended along opposite sides of the beam. Drive electrode 52 is substantially rectangular, although the shape is not critical. Piezoresistor 54 includes contact regions 62 and 64 and a relatively thin pair of legs 66 and 68. The legs extend into the beam medial region from the pads to an enlarged portion 70 that electrically couples the legs. The electrical impedance of the legs is substantially greater than that of enlarged portion 70. Thus, virtually all of the voltage differential between pads 62 and 64 occurs across the legs. This promotes maintaining enlarged portion 70 at a desired voltage level.

Pressure sensing device 16 measures a pressure differential (i.e. the difference between pressures $P_1$ and $P_2$ on opposite sides of diaphragm 22), based on the frequency at which beam 36 oscillates. More particularly, when diaphragm 22 flexes in response to differing pressures $P_1$ and $P_2$, it produces axial or longitudinal stress upon beam 36, altering the strain along the beam. Downward diaphragm flexure tends to elongate beam 36 and increase its natural frequency. Conversely, upward diaphragm deflection tends to allow beam contraction or compress the beam, thus to reduce its resonant frequency.

To maintain the required oscillation of the beam, a periodically oscillating voltage level is provided to drive electrode 52, while a substantially uniform constant electrical field is maintained in the region about the beam. For a more detailed explanation of beam oscillation, reference is made to the aforementioned U.S. Pat. No. 5,275,055, incorporated by reference herein. Piezoresistor 54 functions as a means for detecting the instantaneous position of beam 36 relative to the substrate and cover 42, by generating a detector voltage that varies with the beam position.

Figure 5:
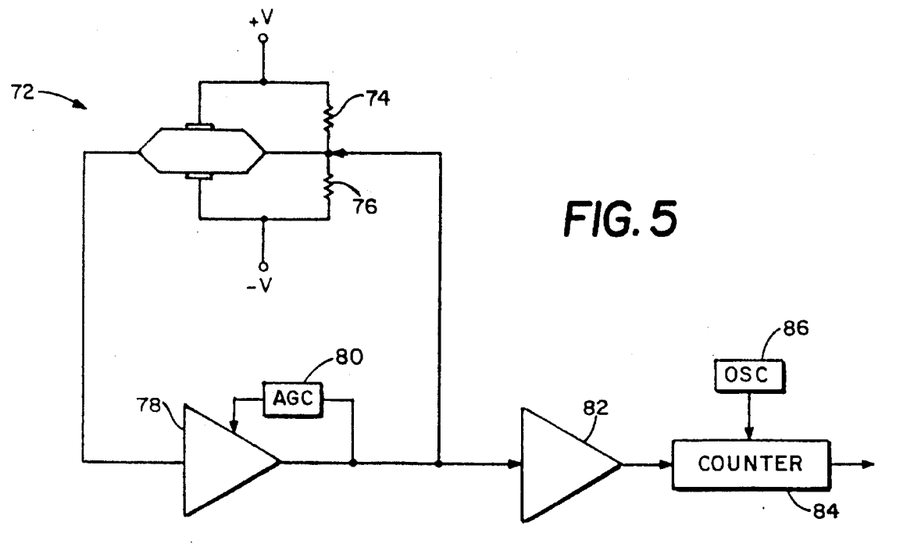
FIG. 5 is a schematic view of a resonant gage and associated oscillator circuit of the device.

The detector voltage is provided as an input to an oscillator circuit, the output of which is the periodic drive voltage signal. The drive voltage signal is provided to drive electrode 52, to maintain beam 36 in steady state oscillation at its natural resonant frequency. For a polysilicon beam of the microscopic size described, the resonant frequency tends to be in the range of 200–500 kHz. The oscillator circuit, shown schematically at 72 in FIG. 5, provides a closed loop for continually adjusting the frequency of the drive signal toward coincidence with the natural resonant frequency of beam 36. Bias electrodes 48 and 50 are biased at levels +V and −V, respectively, to generate a uniform and constant electric field in the region about beam 36, and more particularly about drive electrode 52. Resistances 74 and 76 are approximately equal in value, to bias the drive electrode at ground. As beam 36 mechanically oscillates, piezoresistor 54 provides the detector signal as an input to an amplifier 78 of the oscillator circuit. The detector signal is a voltage that oscillates at the same frequency as the frequency of beam oscillation. An automatic gain control circuit 80 provides feedback to amplifier 78, to prevent distortion at the oscillation frequency. The drive voltage signal, provided to drive electrode 52, is based upon the output of amplifier 78. The oscillator circuit includes diodes (not shown) to clamp the signal amplitude, thus to limit beam oscillation to within the linear response range. Other means of amplitude control, well known in the art, can be used to maintain the drive amplitude.

The output of amplifier 78 is provided to an output buffer amplifier 82. The output of the buffer amplifier is provided to a digital counter 84 controlled by a clock oscillator 86. The output of counter 84 is provided to digital circuitry (not shown) for a direct, real-time reading of strain, pressure, or other parameter that influences the resonant frequency of beam 36 as it oscillates.

As noted above, changes in strain along the length of beam 36, in response to longitudinally applied external forces, alter the natural resonant frequency of the beam. As the beam begins to oscillate at a different frequency in response to a change in strain, the different frequency is sensed in piezoresistor 54, and the detector signal is provided to amplifier 78 at the new frequency. The output of amplifier 78 controls the frequency of the drive voltage signal. Thus, the drive voltage signal frequency is continually and controllably adjusted toward coincidence with the natural resonant frequency of the beam. In practice, changes in resonant frequency as compared to a natural base frequency ($\Delta$ f/f) have been found to be at least six hundred times and up to 1,500 times the changes in strain or beam elongation ($\Delta$ 1/1). This provides a high degree of accuracy and sensitivity to slight changes in strain. By comparison, a conventional single crystal silicon piezoresistor typically has a gauge factor in the range of about sixty to one hundred. This gauge factor is measured in terms of resistance ($\Delta$ R/R) compared to strain ($\Delta$ 1/1).

For more detail as to the oscillator circuit and a method of fabricating the substrate and resonant gauges, reference is made to the aforementioned application Ser. No. 07/937,068.

Returning to FIG. 2, it is to be appreciated that resonant gauge 34 is substantially identical in construction to resonant gauge 32, particularly in that gauge 34 has an elongated flexure element or beam substantially the same size as beam 36, and also formed of fine grain, low tensile strain polysilicon. The utility of resonant gauge 34 depends on its positioning on pressure sensing device 16. More particularly, resonant gauge 34 can be positioned to compensate for temperature induced error in resonant beam 36. Differential pressure is the primary parameter monitored by the device, and changes in the differential pressure dominate changes in beam strain. The beam, however, also is influenced by changes in secondary parameters or conditions, e.g. temperature, which can change the density and elastic modulus of the beam.

Accordingly, strain gauge 34 is provided for temperature compensation, to eliminate or minimize errors in the resonant frequency output caused by changes in temperature. For optimum temperature compensation, resonant gauge 34 is located on rim 20, remote from diaphragm 22. This location is essentially free from the effects of differential pressure (diaphragm flexure) and changes in static pressure (substrate flexure). Thus, the detector voltage output of resonant gauge 32 is influenced by temperature and the flexing of diaphragm 22, while the detector voltage output of resonant gauge 34 is affected only by temperature. Each of the detector voltages can be provided to a counter, with the respective counter outputs processed to determine a compensated differential pressure, virtually free of error due to temperature effects.

The result is substantially improved accuracy in differential pressure measurements. Because resonant gauges 32 and 34 are substantially the same, the substrate and beam elements can be formed monolithically, minimizing mechanical and thermal hysteresis, and substrates supporting two or more resonant gauges lend themselves to batch fabrication.

Figure 6:
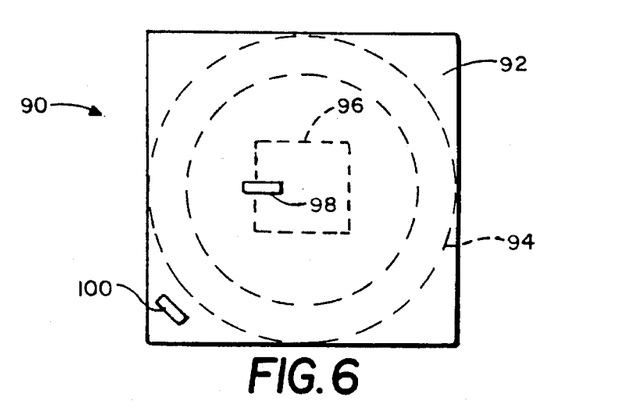
FIGS. 6–8 are top plan views of different alternative pressure sensing devices constructed according to the present invention.

FIG. 6 illustrates an alternative sensing device 90 including a rectangular substrate 92 thermoelectrically bonded to a support indicated in broken lines at 94. Further broken lines at 96 indicate a rectangular diaphragm substantially centered within substrate 92. A primary resonant strain gauge 98 is mounted along a peripheral edge of diaphragm 96, much in the same manner as gauge 32. A secondary, temperature compensating resonant strain gauge 100 is fabricated on a rigid region of the substrate, in particular at a corner of the substrate remote from the diaphragm.

Resonant strain gages are further subject to error due to changes in static pressures. While differential pressures are typically on the order of 15 psi, the static pressures can be substantially higher, e.g. about 2,000 psi. Pressures of this magnitude are sufficient to elastically deform the relatively rigid regions of the substrate.

Figure 7:
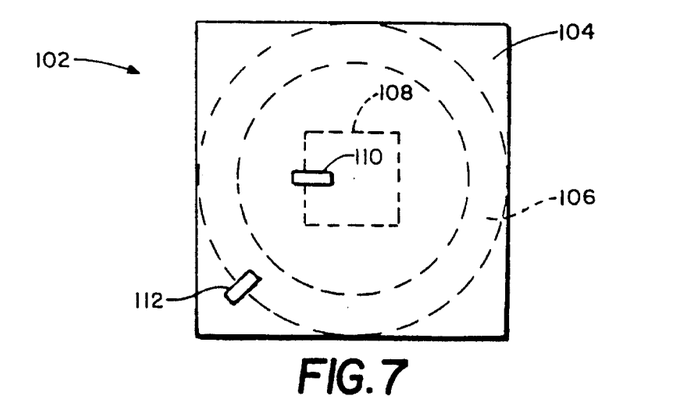

To compensate for static pressure effects, FIG. 7 illustrates a differential pressure sensing device 102 including a rectangular substrate 104 mounted on a Pyrex tube, indicated by broken lines at 106. Further broken lines indicate the location of a rectangular diaphragm formed in the substrate. A primary resonant strain gauge 110 is positioned along a peripheral edge of the diaphragm. A secondary resonant strain gauge 112 is located on the substrate, directly over the face of tube 106, remote from the diaphragm. The resonant gauge can be radially oriented as shown, or tangential. In either event, the location is chosen for the high stresses due to static pressure.

Figure 8:
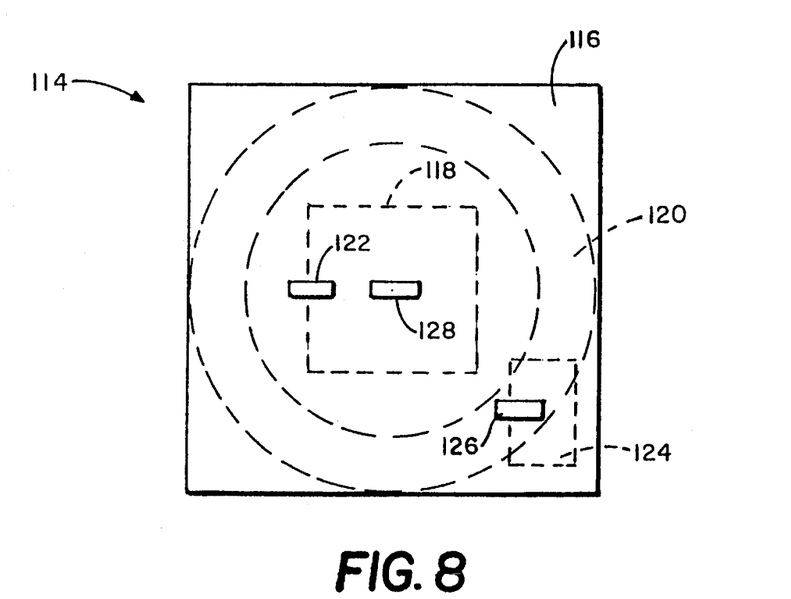

FIG. 8 illustrates an alternative differential pressure sensing device 114 in which a rectangular semi-conductor substrate 116 having a central primary diaphragm 118 is thermoelectrically bonded to a Pyrex tube shown in broken lines at 120. A primary resonant strain gauge 122 is mounted along a peripheral edge of the diaphragm. A secondary diaphragm 124, smaller than primary diaphragm 118, is fabricated in an otherwise substantially rigid substrate region. A secondary resonant strain gauge 126 is positioned along a peripheral edge of the secondary diaphragm. The secondry diaphragm is part of a sealed cavity which provides a reference pressure. Providing the secondary diaphragm dedicated to static pressure measurement is preferred when greater sensitivity is required.

Figure 9:
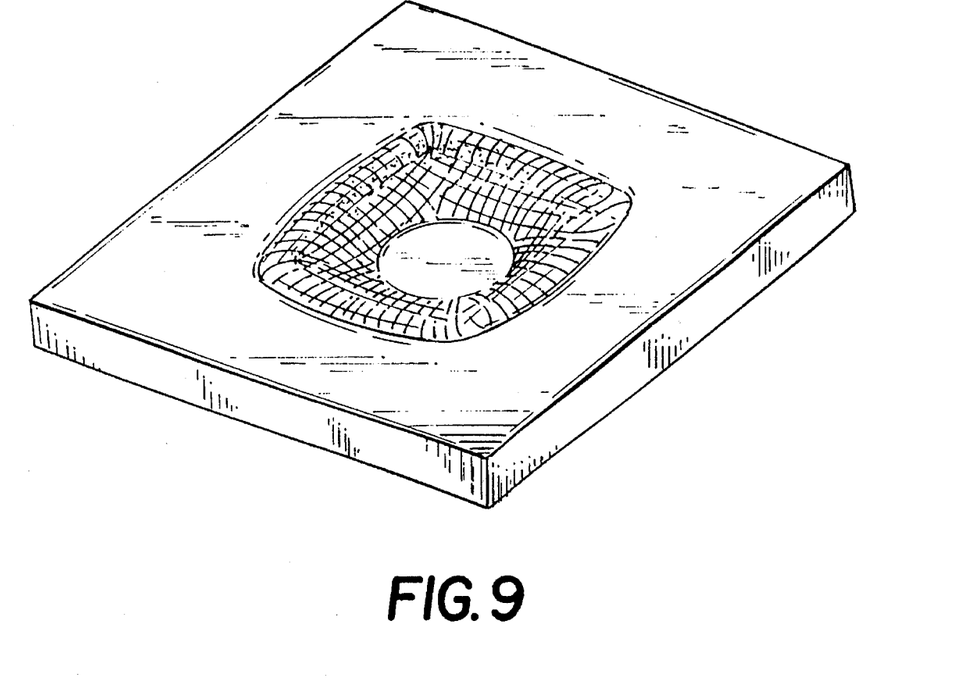
FIGS. 9 and 10 illustrate finite element models of a pressure sensitive semiconductor substrate employed in the pressure sensing devices.
Figure 10:
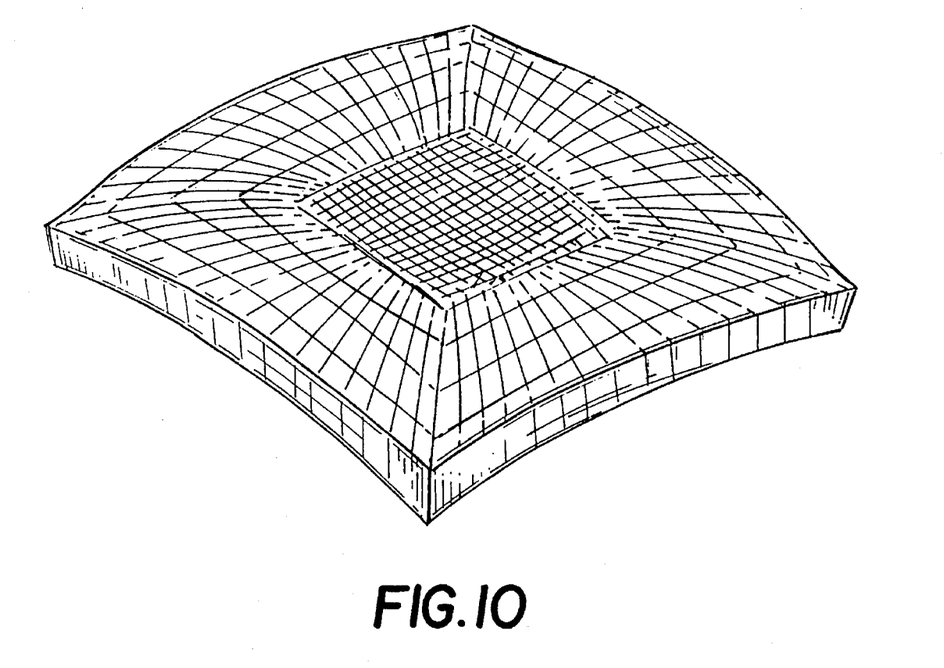

FIGS. 9 and 10 illustrate finite element models of substrate 18 when subjected to a vertically applied load differential of 15 psi, and a static pressure load of 1,000 psi, respectively. As seen in FIG. 9, maximum diaphragm stresses occur near the periphery, particularly near the midportion of each side of the diaphragm. Accordingly, optimal placement of the primary resonant strain gauge is as illustrated in FIGS. 2 and 6–8.

As seen in FIG. 10, the substrate undergoes deflection when subject to static pressure. Secondary resonant strain gauges for temperature compensation are preferably placed outwardly, beyond the point of attachment to the tube. Conversely, secondary resonant strain gauges for static pressure compensation should be placed in alignment with the annular area of attachment to the Pyrex tube, where there is a maximum change in strain due to static pressure.

Returning to FIG. 8, a further primary resonant strain gauge 128 is mounted to substrate 116 at the center of diaphragm 118. Gauge 128, like strain gauge 122, is intended to measure differential pressure. Considering resonant gauges 122 and 128 in view of the finite element model in FIG. 9, it is apparent that a downward deflection of diaphragm 10 ($P_1$ greater than $P_2$) tends to elongate the beam of resonant gauge 122, while compressing the beam of resonant gauge 128. Conversely, upward deflection of the diaphragm compresses the beam of gauge 122 and elongates the beam of gauge 128. The respective resonant frequency signal outputs of resonant gauges 122 and 128 are subtracted, resulting in a representative output at about twice the signal amplitude of each resonant gauge considered alone, for enhanced accuracy. An additional benefit is that first order non-linear effects, a source of possible error particularly at low differential pressures, substantially cancel one another.

Figure 11:
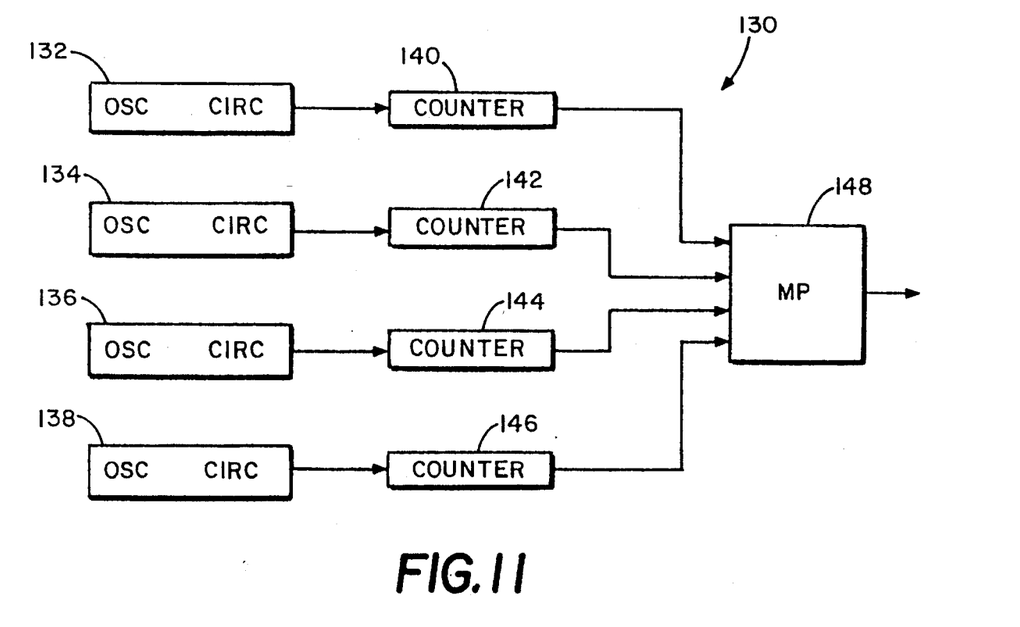
FIG. 11 schematically illustrates a signal processing system for a pressure sensing device employing four resonant microbeam sensors.

FIG. 11 schematically illustrates a signal processing system 130 for generating an output that accurately depicts differential pressure, based on temperature compensation and static pressure compensation. The system includes four oscillator circuits at 132, 134, 136 and 138. The oscillators generate voltage outputs representing the respective natural resonant frequencies of: a primary resonant gauge centrally positioned on the substrate diaphragm; a primary resonant gauge positioned at the diaphragm periphery; a secondary temperature compensating gauge positioned at a peripheral edge of the substrate; and a secondary static pressure compensation resonant gauge aligned with a point of substrate attachment to a Pyrex glass tube.

Digital counters at 140, 142, 144 and 146 receive the respective oscillator outputs, generate respective counts and provide the respective counts to a microprocessor 148. Other well-known means for determining frequencies can be employed. Within the microprocessor, the counts associated with the primary resonant gauges are subtracted, and the resonant frequency outputs of the secondary resonant gauges are processed according to parameters pre-stored in the micro processor, e.g. in a programmable read only memory (PROM), in a known manner. Accordingly, processor 148 provides as its output a precise reading of differential pressure, virtually unaffected by changes in temperature and static pressure.

Alternatively, for temperature compensation, the programming necessary in microprocessor 148 can be simplified considerably by fabricating the primary resonant strain gauge and secondary resonant strain gauge substantially identically, so that the respective flexure beams are the same size, same material and have the same internal strain in the absence of an applied load. This is because the square of the resonant frequency of a resonant microbeam can be closely approximated using the following equation:

$$f^2 = \frac{42Eh^2}{\rho L^4}\left[1 + \frac{2L^2}{7h^2}(\epsilon + \epsilon_0)\right]$$

where E is the modulus of elasticity, rho ($\rho$) is the density, h is the beam thickness, L is the beam length, Epsilon ($\epsilon$) is the strain caused by the sensed variable (e.g. diaphragm deflection due to differential pressure) and $\epsilon_o$ is the residual strain. Assuming that the residual strain is independent of temperature, a reasonable assumption for fine grain polysilicon beams, the frequency is given by:

$$f = g(T)\,a\,(1 + b\epsilon_o + b\epsilon)$$

where g equals E/$\rho$ and depends on temperature. The values a and b are constants that depend on geometry only. Then, the ratio of sensing frequency $f_p$ (primary gauge) to reference frequency $f_s$ (secondary gauge) is:

$$\frac{f_p^2}{f_s^2} = a + b\epsilon$$

This enables the frequency squared ratio to be determined, based upon the constants a and b, in combination with the applied strain $\epsilon$. Thus, calibration is a matter of determining the constants a and b, and can be accomplished by taking respective frequency readings at two different pressure readings at the same temperature. Microprocessor 148 is required to store only the calibration constants a and b, rather than a series of values over a wide range of resonant frequency readings.

This phenomenon enables a convenient calibration means for multiple microbeams fabricated on a single semiconductor wafer where beam dimensions are substantially uniform, as are the internal strain values of each micro beam. In particular, the constants a and b calibrated for one of the beams are assumed to apply to all beams of the semiconductor wafer.

For example, assume a semiconductor wafer is comprised of multiple semiconductor chips, each chip including either a circular or rectangular diaphragm surrounded by a more rigid peripheral region. Assume further that each chip includes at least one strain gage mounted on the diaphragm for responding to differential pressure, and at least one secondary microbeam strain gage mounted to the peripheral region and responsive to changes in temperature. Of course, the primary strain gage also responds to changes in temperature for low precision sensing applications. Calibration of the semiconductor chips can proceed as follows.

First, a selected one of the semiconductor chips is exposed to a first level of differential pressure at a given temperature. Respective natural resonant frequency measurements are taken, for the primary resonant beam and for the secondary resonant beam. Next, the selected semiconductor chip is exposed to a different level of differential pressure, at the same temperature. Again, the natural resonant frequencies of the primary and secondary resonant beams are measured.

Then, the values obtained for natural resonant frequencies are applied to the equation provided immediately above, to solve for the constants "a" and "b". Once obtained in this manner, the constants a and b are retained for future reference in calculating the applied strain epsilon ($\epsilon$), based on the respective measured natural resonant frequencies of the primary and secondary resonant beams. The constants a and b can be applied not only to the selected chip, but to all other semiconductor chips of the semiconductor wafer, because all of the resonant beams subject to calibration have been fabricated to be substantially uniform in size and residual stress.

Figure 12:
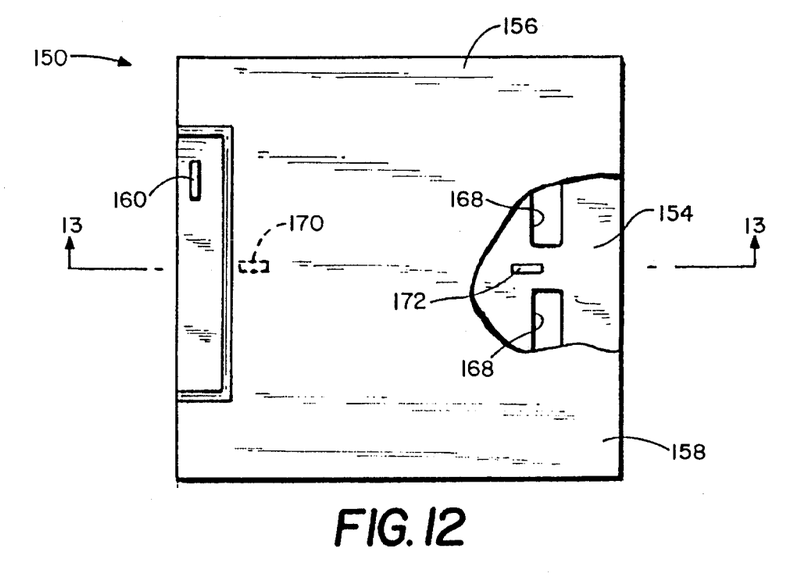
FIG. 12 is a top plan view of an accelerometer constructed according to the present invention.
Figure 13:
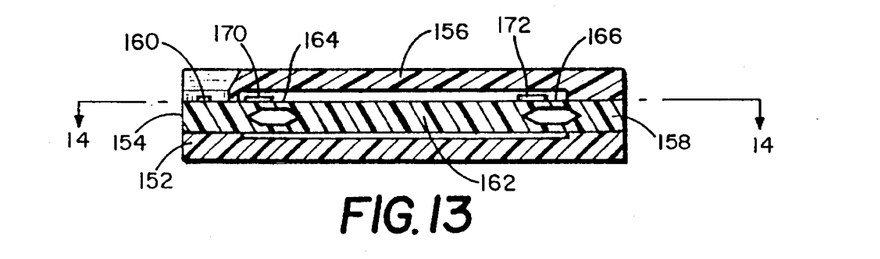
FIG. 13 is an enlarged sectional view of the accelerometer, taken along the line 13—13 in FIG. 12.
Figure 14:
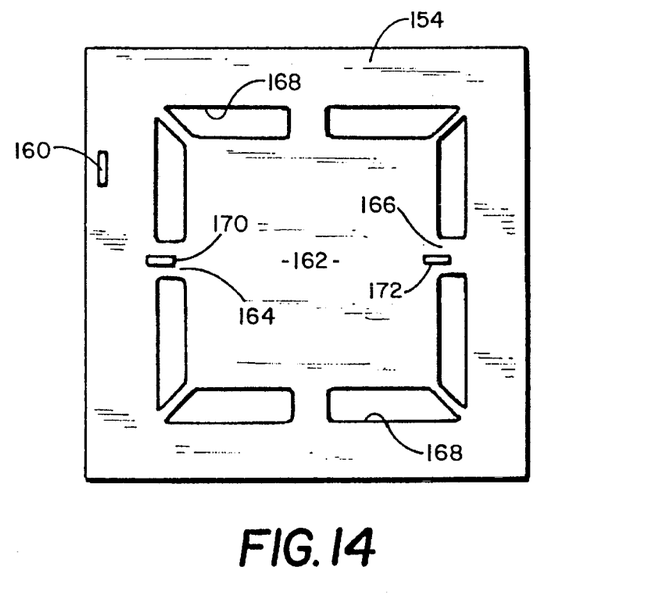
FIG. 14 is a sectional view of a the accelerometer taken along the line 14—14 in FIG. 13.

FIGS. 12–14 illustrate an accelerometer 150 fabricated of semiconductor material. The accelerometer includes a first substrate layer 152 preferably formed of silicon, a second substrate layer 154 including a proof mass; and a third substrate capping layer 156. Together, these layers provide a relatively rigid peripheral rim 158. A secondary resonant strain gauge 160, for temperature compensation, is fabricated in polysilicon layer 154 along the rim and beyond cover layer 156.

As best seen in FIG. 14, semiconductor substrate layer 154 includes a proof mass 162, supported relative to peripheral rim 158 by eight narrow bridges or flexures, two of which are indicated at 164 and 166. Between each pair of adjacent bridges, there is a gap between the proof mass and the peripheral rim. Several of these gaps are indicated at 168. As seen in FIG. 13, each of bridges 164 and 166 consists of upper and lower narrowed regions formed in semiconductor substrate layer 154. These narrowed regions flex to allow displacement of proof mass 162 relative to substrate 152 and cover 156, vertically as viewed in FIG. 13. Such displacement of the proof mass occurs when the accelerometer is subject to accelerations.

Accelerometer 150 includes two primary resonant strain gauges 170 and 172, one fabricated onto substrate layer 154 at each of bridges 164 and 166. Each primary resonant gauge includes a resonant microbeam, supported at both ends and subject to induced strain from flexure of its associated bridge during accelerations and decelerations.

The primary resonant strain gauges are selectively positioned for a cumulative response. More particularly, resonant gauge 170 is mounted toward an outward or peripheral edge region of its associated bridge 164. By contrast, resonant gauge 172 is mounted proximate an inward edge region of bridge 166. Consequently, an acceleration induces compressive strain on one of the resonant gauges while simultaneously inducing tensile strain upon the other gauge. For example, whenever accelerometer 150 is subject to an upward acceleration (as viewed in FIG. 13), proof mass 162 tends to lag relative to the remainder of the accelerometer. In other words, the proof mass is displaced downwardly relative to cover 156 and substrate 152. This downward movement tends to elongate the upper narrowed region of bridge 164 near resonant gauge 170 while tending to shorten the upper narrowed region of bridge 166 near resonant gauge 172. The respective resonant frequency signal outputs of resonant gauges 170 and 172 are subtracted, resulting in a representative output at about twice the signal amplitude of each resonant gauge alone, for enhanced accuracy. A further advantage is that first order non-linear effects, a source of possible error particularly at low accelerations, substantially cancel one another.

Secondary resonant strain gauge 160 is fabricated onto the accelerometer along the peripheral rim, remote from proof mass 162 and the bridges. At this location, secondary resonant gauge 160 remains subject to induced strain due to temperature effects. At the same time, secondary gauge 160 is virtually free of effects due to accelerations, in particular free of induced strain due to bridge flexure. Accordingly, an output detector voltage of the secondary resonant gauge can be combined with the detector output voltages of primary resonant gauges 170 and 172, to yield an output compensated for temperature effects. It is to be appreciated that secondary resonant gauge 160 can be fabricated onto proof mass 162 at a point remote from the bridges, if desired. Also, oscillator circuits associated with the primary resonant gauges and the secondary gauge, while not illustrated, can be substantially as described above in connection with the differential pressure sensing devices.

Thus, in accordance with the present invention, two or more resonant micro beam sensors can be fabricated monolithically on a semiconductor substrate, and used in concert to provide enhanced accuracy in measuring a primary condition or parameter, e.g. differential pressure or acceleration. Precision is enhanced by positioning one or more secondary resonant microbeam sensors, in a manner that each sensor responds only to a secondary parameter or condition, e.g. temperature or static pressure. In each case, the location of the primary or secondary sensor is determined based on finite element modelling of the substrate to determine the nature Of its response to one or more of the parameters. If a temperature compensation microbeam has the same size, construction and internal strain as the primary resonant microbeam, a simple calibration involving two constants can be employed in lieu of storing multiple compensation values in a PROM or other computer memory. Further, in connection with temperature compensation, a cantilevered mounting of the temperature compensation microbeam eliminates the need for critically positioning the sensor.

We claim:

1. A sensing device including:

a silicon substrate having a substantially rigid first region comprising a rim and a second region compressing a diaphragm surrounded by the rim and more flexible than the rim, the diaphragm flexing in response to variations in a first parameter;

an elongate primary vibratory element having opposite first and second end portions fixed with respect to the substrate to position the primary vibratory element along the second region, for lengthwise extension and contraction of the primary vibratory element responsive to the flexing of the second region, said extension and contraction varying a primary natural resonant frequency of the primary vibratory element, said primary vibratory element comprising an elongate polysilicon beam located at and perpendicular to an edge of the diaphragm;

an elongate secondary vibratory element fixed with respect to the substrate, said secondary vibratory element having a secondary natural resonant frequency variable in response to changes in a second parameter, while substantially unaffected by variations in the first parameter; and a means for sensing the primary and secondary resonant frequencies and for generating an output representing the primary parameter compensated for the effect of the secondary parameter, based on said primary and secondary natural resonant frequencies.

2. The sensing device of claim 1 wherein:

the secondary vibratory element comprises an elongate beam of polysilicon formed along the rim.

3. The sensing device of claim 2 wherein:

the primary parameter is a pressure differential across the diaphragm, the secondary parameter is temperature, and the secondary polysilicon beam is oriented selectively to minimize static pressure effects.

4. The sensing device of claim 2 wherein:

the primary parameter is a pressure differential across the diaphragm, the secondary parameter is static pressure applied to the substrate, and the secondary polysilicon beam is selectively located for a maximum response to static pressure effects.

5. The sensing device of claim 2 wherein said means for sensing the primary and secondary resonant frequencies includes:

a primary position sensing means for sensing the position of the primary vibratory element relative to the substrate and generating a primary position signal indicating the position of the primary vibratory element as it oscillates;

a primary oscillating means for driving the primary vibratory element in a periodic mechanical oscillation relative to the substrate, said primary oscillating means receiving the primary position signal and controllably adjusting the frequency of the periodic mechanical oscillation in response to variations in the primary position signal frequency, toward coincidence with the primary natural resonant frequency;

a secondary position sensing means for sensing the position of the secondary vibratory element relative to the substrate, and generating a periodic secondary position signal indicating the position of the secondary vibratory element as it oscillates; and a secondary oscillating means for driving the secondary vibratory element in a mechanical oscillation relative to the substrate, the secondary oscillating means receiving the secondary position signal and controllably adjusting the frequency of the periodic mechanical oscillation in response to variations in the secondary position signal frequency, toward coincidence with the secondary natural resonant frequency of the secondary vibratory element.

6. The sensing device of claim 5 wherein:

each of the primary and secondary oscillating means comprises a drive electrode formed on the polysilicon beam, a means for generating a substantially constant electrical field in the region of the polysilicon beam, and a means for applying a periodic drive voltage signal to the drive electrode.

7. The sensing device of claim 6 wherein:

the primary and secondary position sensing means comprise piezoresistors formed respectively on the primary and secondary polysilicon beams.

8. The sensing device of claim 6 wherein:

said means for sensing the primary and secondary resonant frequencies comprises a signal processing means operatively coupled to the primary and secondary oscillating means, for generating an output based upon the primary and secondary position signal frequencies.

9. The sensing device of claim 8 wherein:

the signal processing means includes a first frequency measurement means for generating a first output based on the drive voltage signal applied to the drive electrode of the primary polysilicon beam, a second frequency measurement means for generating a second output based on the drive voltage signal applied to the drive electrode of the secondary polysilicon beam, and a microprocessor receiving the first and second outputs.

10. The sensing device of claim 1 wherein:

said means for sensing the primary and secondary resonant frequencies generates said output representing the primary parameter compensated for the effect of the secondary parameter, based on a ratio of the square of the primary natural resonant frequency to the square of the secondary natural resonant frequency.

11. A sensing device including:

a semiconductor substrate including a flexible region that undergoes flexing in response to variations in a first parameter, and a rigid region adjacent to the flexible region and not flexing in response to said variations in the first parameter;

an elongate primary vibratory element formed of a semiconductor material and having opposite first and second end portions fixed to said flexible region of the substrate for lengthwise extension and contraction of the primary vibratory element responsive to the flexing of the flexible region, said extension and contraction varying a primary natural resonant frequency at which the primary vibratory element tends to oscillate, said primary natural resonant frequency further varying with changes in a second variable condition;

an elongate secondary vibratory element formed of a semiconductor material and having opposite first and second end portions fixed to said rigid region of the substrate for lengthwise extension and contraction of the secondary vibratory element responsive to variations in the second parameter, said extension and contraction varying a secondary natural resonant frequency at which the secondary vibratory element tends to oscillate;

a primary resonant frequency sensing means for sensing the primary natural resonant frequency and generating a primary frequency signal based on the primary resonant frequency;

a secondary frequency sensing means for sensing the secondary natural resonant frequency and for generating a secondary frequency signal based on the secondary resonant frequency;

a means for receiving the primary and secondary frequency signals and for generating an output representing the first variable condition compensated for the effect of the second variable condition, based on said frequency signals.

12. The device of claim 11 wherein:

the first variable condition is a pressure difference between respective first and second pressures on opposite sides of said flexible region of the substrate.

13. The device of claim 11 wherein:

the second variable condition comprises temperature.

14. The device of claim 11 wherein:

the second variable condition comprises static pressure on the substrate.

15. The device of claim 11 wherein:

the primary vibration element and the secondary vibratory element second comprise, respectively, first and second elongate polysilicon beams.

16. The device of claim 11 wherein:

said flexible region of the substrate includes a flexible diaphragm and said region of the substrate includes a substantially rigid peripheral rim surrounding and supporting the diaphragm; and the first variable condition is a differential between first and second pressures on opposite sides of the diaphragm, and the first flexure element is located along and perpendicular to an edge of the diaphragm.

17. The device of claim 16 wherein:

the secondary vibratory element is mounted along the substantially rigid peripheral rim.

18. The sensing device of claim 11 wherein:

said means for receiving the primary and secondary signals generates said output representing the first variable condition compensated for the effect of the second variable condition, based on a ratio of the square of the primary natural resonant frequency to the square of the secondary natural resonant frequency.

19. The device of claim 11 wherein said means for receiving the primary and secondary frequency signals includes:

a primary oscillating means for oscillating the primary vibratory element relative to the substrate, said primary oscillating means receiving the primary frequency signal and controllably adjusting the frequency at which it oscillates the primary vibratory member toward coincidence with the primary natural resonant frequency in response to variations in the primary frequency signal;

a secondary oscillating means for oscillating the secondary vibratory element relative to the substrate, said secondary oscillating means receiving the secondary frequency signal and controllably adjusting the frequency at which it oscillates the secondary vibratory member toward coincidence with the secondary natural resonant frequency in response to variations in the secondary frequency signal; and a signal processing means operatively coupled to the primary and secondary oscillating means, for generating an output based upon the primary frequency signal and the secondary frequency signal, said output representing the first variable condition compensated for the effect of the second variable condition.

20. The device of claim 11 wherein:

the substrate includes a proof mass, a substantially rigid peripheral rim surrounding the proof mass, and a plurality of flexible bridges supporting the proof mass relative to the rim and cooperating to provide said flexible region, said bridges flexing to permit movement of the proof mass relative to the rim;

the first variable condition is an acceleration, and the primary vibratory element is located along one of said bridges; and the second variable condition is temperature, and the secondary vibratory element is mounted along the substantially rigid rim.

21. A sensing device including:

A semiconductor substrate having a flexible region that undergoes flexing in response to changes in a first variable condition, and a rigid region adjacent the flexible region that does not flex in response to the changes in the first variable condition;

an elongate primary vibratory element formed of a semiconductor material and having first and second opposite ends fixed to the flexible region of the substrate for lengthwise extension and contraction of the primary vibratory element responsive to the flexing of the flexible region and responsive to changes in a second variable condition;

an elongate secondary vibratory element formed of a semiconductor material and having opposite first and second end portions fixed to the rigid region of the substrate for lengthwise extension and contraction of the secondary vibratory element responsive to said changes in the second variable condition;

wherein the primary vibratory element and the secondary vibratory element have respective primary and secondary natural resonant frequencies that vary with the lengthwise extension and contraction of the primary and secondary vibratory elements, respectively; and a means for sensing the primary and secondary natural resonant frequencies and for generating an output representing the first variable condition compensated for the effect of the second variable condition, based on said primary and secondary natural resonant frequencies.

22. The sensing device of claim 21 wherein:

the substrate is formed of silicon, and the primary and secondary vibratory elements comprise polysilicon beams.

23. The sensing device of claim 21 wherein:

the first variable condition is a differential between first and second pressures on opposite sides of the flexible region of the substrate, and the second variable condition is temperature.

24. The sensing device of claim 21 wherein:

the first variable condition is a differential between first and second pressures on opposite sides of the flexible region of the substrate, and the second variable condition is static pressure applied to the substrate.

25. The sensing device of claim 21 wherein:

the substrate further includes a proof mass, and the flexible region includes a plurality of flexible bridges supporting the proof mass relative to the rigid region of the substrate, and wherein the first variable condition is a displacement of the proof mass relative to the rigid region caused by an acceleration of the substrate.

* * * * *